UNITED STATES PATENT OFFICE.

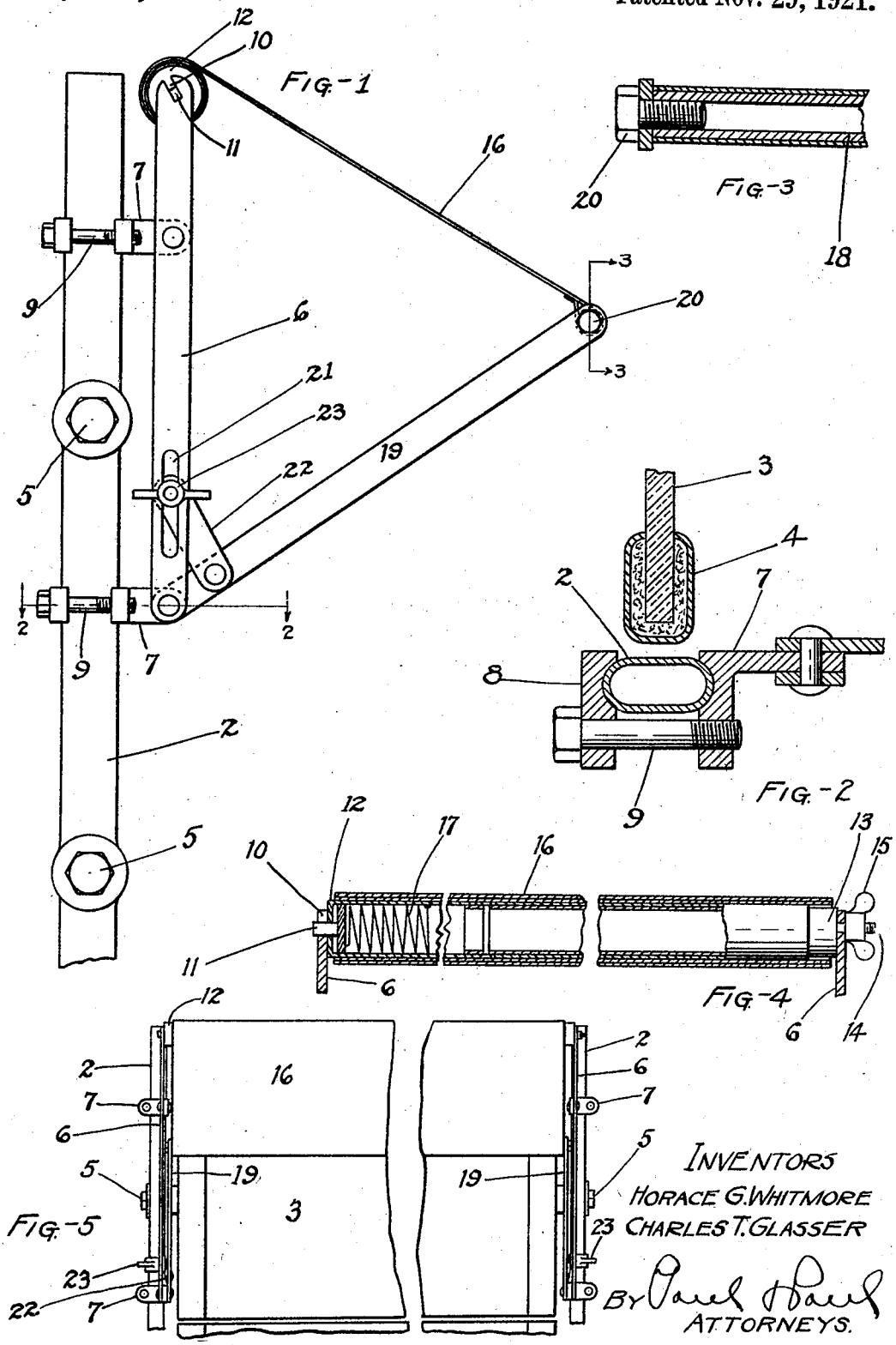

HORACE G. WHITMORE AND CHARLES T. GLASSER, OF MINNEAPOLIS, MINNESOTA.

WINDSHIELD-SHADE.

1,398,661.  Specification of Letters Patent.  Patented Nov. 29, 1921.

Application filed September 23, 1920. Serial No. 412,202.

*To all whom it may concern:*

Be it known that we, HORACE G. WHITMORE and CHARLES T. GLASSER, citizens of the United States, residing at Minneapolis, county of Hennepin, State of Minnesota, have invented certain new and useful Improvements in Windshield-Shades, of which the following is a specification.

The object of our invention is to provide a wind shield shade that is adapted for any width or construction of frame of the wind shield.

A further object is to provide improved means for locking the shade in its unrolled or extended position.

Other objects of the invention will appear from the following detailed description.

The invention consists generally in various constructions and combinations, all as hereinafter described and particularly pointed out in the claims.

In the accompanying drawings forming part of this specification,

Figure 1 is an end view of a wind shield frame with our improved shade applied thereto, Fig. 2 is a sectional view on the line 2—2 of Fig. 1, Fig. 3 is a sectional view on the line 3—3 of Fig. 1, Fig. 4 is a detail sectional view of the roller on which the shade is wound, Fig. 5 is a front elevation of the shield and shade.

In the drawing, 2 represents the upright side bars of the frame of the wind shield. 3 is the glass shield having the usual frame 4 and the supports 5 on the bars 2. All this is ordinary and well known construction. Our improved shade is mounted in front of the wind shield and has the function of deflecting rain or snow from the shield and is also used in the bright sunlight to deflect the rays from the glass shield and the eyes of the driver. The frame supporting the shade consists preferably of upright side rails or bars 6. Brackets 7 are secured to these bars at each end of the wind shield and seated against one edge of the rails 2 and blocks 8 are seated against the opposite edges of the rails and secured to the brackets 7 by suitable means, such as bolts 9. This mechanism forms the clamping means for the shade frame on the shield.

The upper end of one of the bars 6 is provided with a notch 10 to receive the lug 11 that is mounted in the tubular member 12 forming one section of the roller. The other section 13 is adapted to telescope with the section 12 and is provided with a threaded stud 14 fitting a hole in the opposite bar of the shade frame and provided with a thumb nut 15. When this thumb nut is tightened, the roller is held securely in the frame and the telescoping feature thereof adapts it for adjustment to adapt the shade for wind shields of different lengths. The shade 16 is wound on the roller in the usual manner and a spring 17 is mounted in the roller and normally tends to wind the shade thereon in substantially the same manner as in the well-known window shade rollers. A loop is formed in the free end of the shade to receive a rod 18 that is mounted in the forward ends of bars 19 by suitable means, such as screw bolts 20. The bars 19 are supported by the lower bracket of the shade and preferably has the same pivotal connection with the bracket as the upright bars 6 and said bars 19 are free to oscillate in a vertical plane on their pivots.

The bars 6 are provided with longitudinal slots 21 and links 22 are pivotally connected with the bars 19 and are adjustable in the slots 21 by means of a stud and wing nut adjusting means 23. When this wing nut is loosened, the links may be raised or lowered in the slots 21 and the position of the bars changed to roll or unroll the shade.

In using the device, the connections of the links 22 with the bars 6 will be loose, the shade is unrolled to the desired point against the tension of the roller spring and the wing nuts 23 are then tightened, thereby securely locking the bar 19 against movement in either direction. It will be understood that when the locking device is released, the tension of the spring will wind up the shade and the bars 19 may be drawn down and the shade unrolled until the links 22 reach the lower ends of the slots 21.

We claim as our invention:

1. The combination, with a wind shield frame, of clamps secured thereto, bars mounted on said clamps in front of and adjacent to said frame, the upper ends of said bars being adjacent the top of said frame, a shade roller and shade having bearings in the upper ends of said bars, arms pivoted at one end to the lower ends of said bars and having means at their outer ends for connection with the free end of said shade, and links pivoted on said arms near said bars and having sliding clamping adjustment with said bars for forcing said arms downwardly against the tension of said shade and roller.

2. The combination, with a wind shield frame, of clamps secured thereto, bars mounted on said clamps in front of and adjacent to said frame, the upper ends of said bars being near the top of said frame, said bars having slots in their upper ends and a shade roller having lugs to enter said slots and a shade wound on said roller, arms pivotally supported by said clamps at the lower ends of said bars and projecting outwardly and upwardly therefrom and having a rod supported between their outer ends, whereto the free end of the shade is attached, said bars having vertical slots therein near their lower ends and links pivoted at one end on said arms adjacent to said bars and having bolt and wing nut connections with the slots in said bars, downward movement of said links in said slots operating to force said arms downwardly and put said shade under tension.

In witness whereof, we have hereunto set our hands this 16th day of September, 1920.

HORACE G. WHITMORE.
CHARLES T. GLASSER.